April 28, 1953     H. V. TORNEBOHM     2,636,279
ADJUSTABLE GAUGE BLOCK
Filed Dec. 30, 1947                      2 SHEETS—SHEET 1
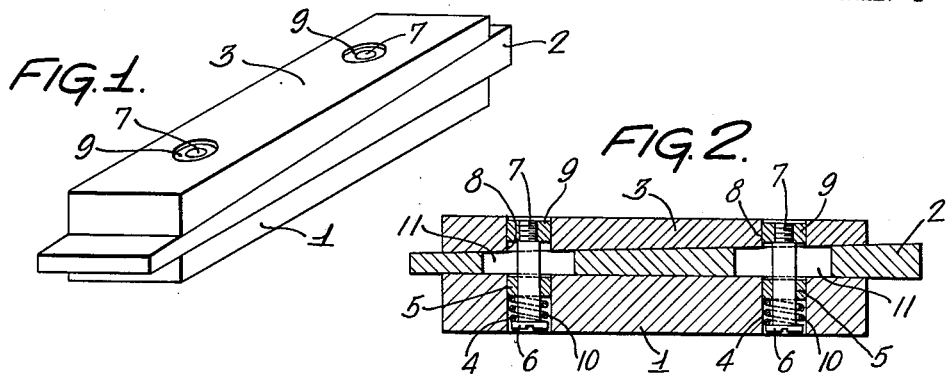
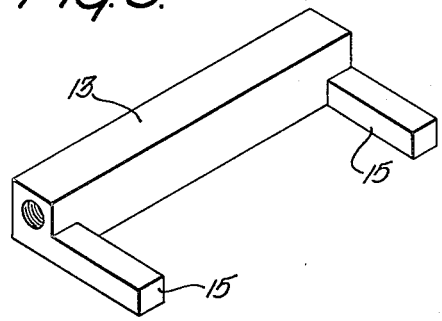
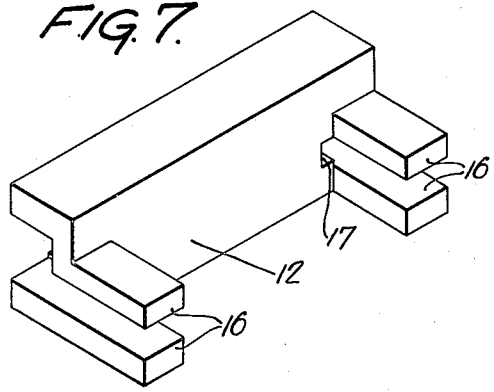
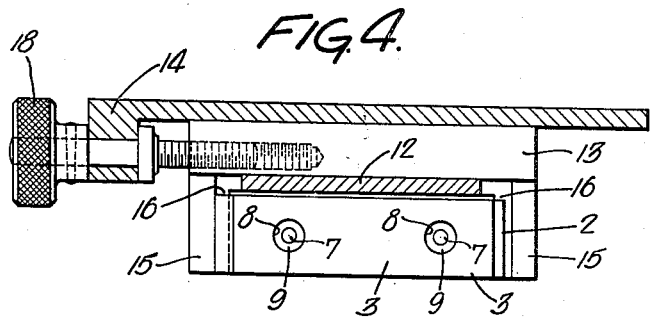
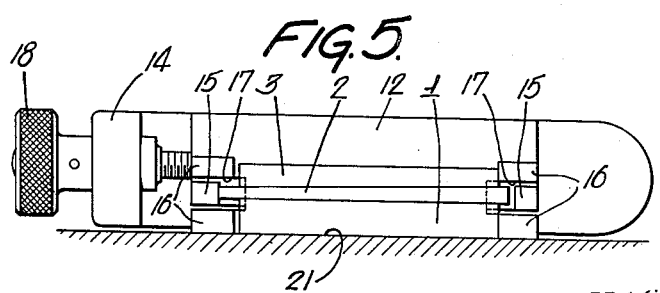
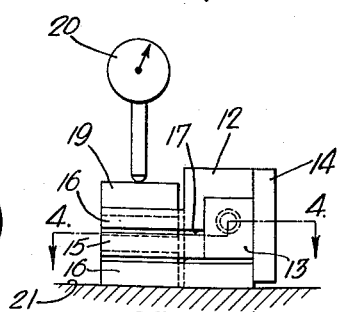
Inventor:
Hilding Valdemar Tornebohm
by his Attorneys
Howson & Howson April 28, 1953     H. V. TORNEBOHM     2,636,279
ADJUSTABLE GAUGE BLOCK
Filed Dec. 30, 1947     2 SHEETS—SHEET 2
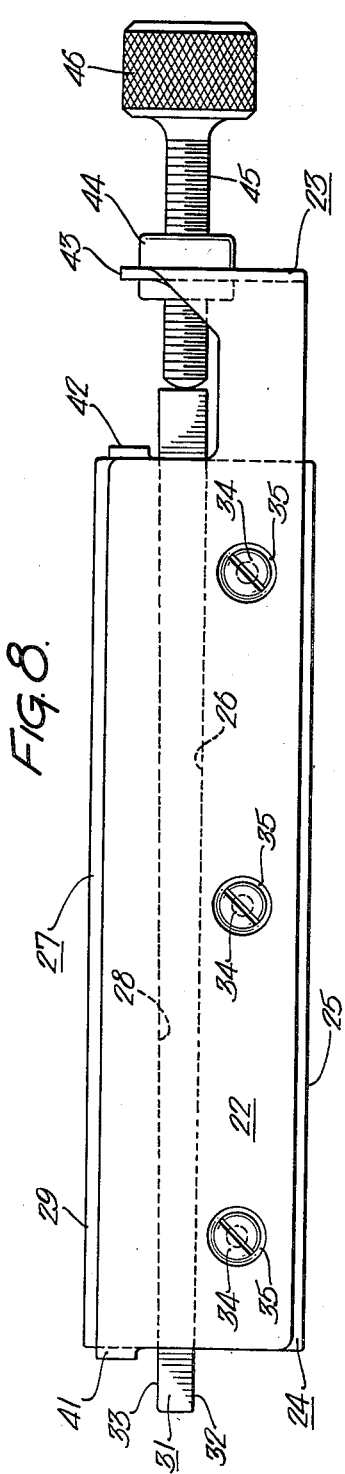
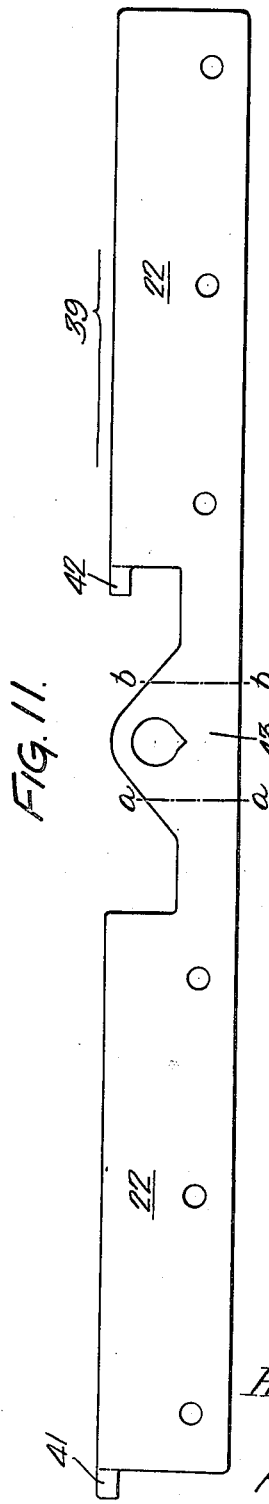
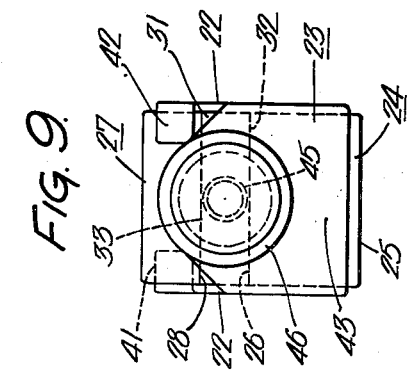
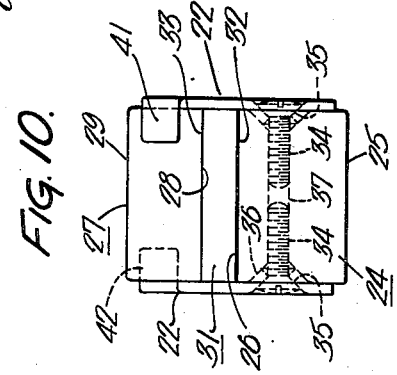
Inventor:
Hilding Valdemar Tornebohm
by his Attorneys
Howson & Howson Patented Apr. 28, 1953

2,636,279

UNITED STATES PATENT OFFICE 2,636,279

ADJUSTABLE GAUGE BLOCK

Hilding Valdemar Törnebohm, Gothenburg, Sweden, assignor to Aktiebolaget Svenska Kullagerfabriken, Gothenburg, Sweden, a corporation of Sweden Application December 30, 1947, Serial No. 794,715
In Sweden July 1, 1943

13 Claims. (Cl. 33—168)

The sets of precision gage blocks hitherto used have usually comprised a number of steel gage blocks having a pair of plane parallel surfaces the distance between which has been adjusted with great accuracy to a previously determined dimension. The gage blocks can be combined in different ways in order to obtain any desired predetermined interval within the range of the set and with an accuracy determined by the interval between the combinations and the accuracy for which the set has been made. One of the characteristics of a set of gage blocks of this type is that the surfaces of the blocks are made with such accuracy that the gage blocks adhere to each other solely by molecular attraction when wrung together. This characteristic makes it possible to use a number of blocks when wrung together as though they were a single unit.

It is apparent that the number of gage blocks comprising a set must be considerable and is greatly increased when smaller intervals are required between the different combinations. Since each gage block is the result of lengthy accurate work in its manufacture, it will be quite expensive to make. Especially is this the case with gage blocks permitting small intervals, and consequently a set of gage blocks of this kind represents a considerable capital investment. In order to decrease the number of gage blocks required while maintaining or even increasing the number of combinations (i. e. decreasing the intervals between the combinations obtainable), it has been suggested to include in the set of gage blocks one adjustable gage block by means of which dimensions between the intervals of the combinations of blocks may be obtained.

The following will serve as example of what may be accomplished by these means. A standard set of gage blocks comprises 103 gage blocks with a supplementary set comprising 9 gage blocks by means of which all dimensions within the limit of the set can be obtained to intervals of $\frac{1}{1000}$ of a millimeter. By using an adjustable gage block as referred to above, the set of 112 gage blocks can be replaced by a set comprising considerably fewer gage blocks. The set of gage blocks thus formed will be considerably cheaper than the standard set and more convenient to use since the different dimensions may be obtained with the use of a fewer number of gage blocks in most cases.

The adjustable gage blocks as hitherto used have comprised two halves of wedge-shaped form having graduations on their side surfaces indicating the distance between their plane parallel surfaces. Within certain limits the distance between the surfaces can be varied as indicated by the graduations simply by sliding one of the blocks upon the other. A set of gage blocks of this type is, as is the case with a set of standard gage blocks only, subject to one very great inconvenience, namely, that it is impossible to compensate for the rather considerable wear which takes place in a set of gage blocks used in shop-work, since the graduations on the adjustable gage block are correct only for the adjustable gage block when it is new and each dimension required must be built up from a number of gage blocks, each of which is correct only when new but each of which may be incorrect after use.

The invention described in the following comprises a gaging set having a number of gage blocks of ordinary type and at least one adjustable gage block combined with a dial indicating instrument of a sensitiveness which permits readings to be made for dimensions within the intervals obtainable with the standard gage blocks.

The invention is described in connection with the accompanying drawings in which Fig. 1 shows an adjustable gage block of preferred form in perspective; Fig. 2 is a longitudinal sectional view through the gage block shown in Fig. 1; Fig. 3 is an end elevational view of the gage showing the method of adjusting the adjustable gage block; Fig. 4 is a sectional view on the line 4—4, Fig. 3; Fig. 5 is a side elevational view of the gage; Figs. 6 and 7 are views in perspective of separate elements of the adjustable gage block; Fig. 8 is a side elevational view of a gage constituting another embodiment of the invention; Figs. 9 and 10 are elevational views from the right and left hand ends respectively of the gage as shown in Fig. 8; and Fig. 11 is a view of the sheet metal blank from which is formed the casing element of the gage.

The gage block shown in Fig. 1 consists of three main parts, of which the member 1 has two parallel plane sides, while the intermediate member 2 and the other outer member 3 are wedge-shaped and have the same angles so that the outer plane surfaces of members 1 and 3 will be parallel to each other. The effective dimension of the gage block is determined by the distance between the two surfaces mentioned and this distance is adjustable in a manner which will be apparent from the following:

The member 1 is provided with two holes 4, in which are sleeves 5, which guide the stems of two screws or pins 7 having heads 6. The member 3 is provided with two holes 8, into which are forced annular members 9, into which the pins 7 are pressed or screwed. Between the heads 6 and the annular members 5 are springs 10, which press the members 1 and 3 against the intermediate member 2. The said intermediate member is provided with two oblong holes 11, which permit the intermediate member to be displaced relative to the other two members.

It is apparent that if the intermediate member were allowed to assume an oblique position relative to the outer member 3 the result would be that the planes of the gaging surfaces would no longer be parallel to each other. The pins 7 guide the intermediate member and prevent it from assuming an oblique position relative to the two other members, which are guided relative to each other by the pins 7. Hereby the planes of the gaging surfaces of the gage block are maintained parallel to each other.

Fig. 2 shows clearly that the thickness of the gage block can be varied by displacing the intermediate member 2. By pressing the member 2 to the left as viewed in the figure relative to the members 1 and 3 the thickness of the gaging block is increased, and by pressing it to the right the thickness is decreased, the members 1 and 3 being maintained pressed against the member 2 by the springs 10. The gaging block can be suitably made so that the difference between the least dimension and the greatest dimension is at least equal to the intervals which can be obtained with the other gage blocks comprising the set, for instance an interval of one tenth of 1 mm. The gage block may be adjustable between 9.95 and 10.05 mm. If it is to be used for obtaining a dimension of say 15.532 mm., the adjustable gage block is first adjusted to 10.032 mm. and is combined with a gage block of 5.5 mm. The corresponding dimension is obtained with standard gage blocks by combining one gage block of 1.002 mm., one of 1.03 mm. and one of 13.5 mm. In the first mentioned case only two gage blocks have been required instead of three in the second case. With the aid of only the two gage blocks mentioned in the first case all dimensions with intervals of one thousandth of a mm. between 15.45 and 15.55 mm. may be obtained. Further, it is also possible to obtain dimensions included between the intervals named. With an adjustable gage block of this kind it is therefore possible to entirely dispense with the expensive gage blocks belonging to the series for obtaining thousandths of a mm., and also to dispense with the whole of the first series, i. e. the series for obtaining hundredths of a mm. with the exception of gage blocks for even tenths such as 1.0, 1.1, 1.2 etc.

The gage block is adjusted in the following manner with the aid of a suitable device of the kind shown in Figs. 3–7. The adjusting device comprises two main members 12 and 13 movable relative to each other. The member 13 is movable within the member 12, in which it is retained by means of a plate 14 screwed to the member 12. The member 13 is provided at each end with a projection 15 and the member 12 is provided at each end with two projections 16. The projections 15 move in slots 17 in the member 12 and are located between the projections 16. A screw 18 is rotatable in the plate 14 and is threaded in the member 13. By turning the screw 18 it is therefore possible to forcibly displace the member 13 in one or the other direction in the member 12.

The adjustment of the adjustable gage block, for instance, for the dimension 15.532 given above, takes place with the aid of a sufficiently sensitive indicating instrument such as a microcator or a minimeter. The instrument is first adjusted by means of ordinary gage blocks to the nearest tenth of a mm. In the case under discussion this means that it is adjusted so that the reading on the scale which corresponds to the dimension 15.5 mm. is determined. The adjustable gage block is then inserted in the adjusting device so that the intermediate member 2 will be opposite the projections 15 and the outer members 1 and 3 will be opposite the projections 16. The gage block is preferably located in a horizontal position, as shown in Fig. 3, together with a gage block 19 of 5.5 mm. dimension under the microcator which is diagrammatically shown at 20. This may be supported by suitable means (not shown) in predetermined position with respect to a base plate 21 which also supports the adjustable gage block. By turning the screw 18 the member 13 with its projections 15 is displaced and actuates the intermediate member 2 to displace the latter relative to the outer members 1 and 3 of the gage block. These latter members are prevented from being displaced by one of the pairs of projections 16. By following the reading on the scale of the microcator 20 and continuing the adjustment until the microcator shows a plus reading of 0.032 mm. the whole gage block combination has obtained the required dimension 15.532 mm. The original adjustment of the microcator is preferably made with a combination of gage blocks from a master set and the adjustment of the gage block combination therefore depends directly on the reading of the instrument and is entirely independent of the wear on the individual gage blocks.

Many modifications may be made in the form of the gage described without departing from the spirit of the invention. The adjustable gage block shown is made in three parts but may instead be made in more than three parts or in only two parts corresponding to the members 2 and 3. The latter form of the invention is not so effective as the form shown for the reason that the gaging surfaces of the block are displaced relative to each other during the adjustment. In the form of the invention illustrated there is no relative displacement of the gaging surfaces except in the normal direction. The indicating instruments used in connection with the invention may be of any desired type which is sufficiently sensitive and which has a gaging field covering at least half of the interval between the combinations which may be obtained with the aid of the standard gage blocks in the set.

The members 4 holding together the different members of the gage block aforedescribed may be partly or wholly dispensed with if desired, in which case the parts are held together only by the adhesion between them. It is important, however, that the members of the block be maintained in alignment with each other since, as previously indicated, the slightest deviation from the correct alignment will, by reason of the tapered form of the members, or two of them, throw the opposite gaging surfaces of the block out of their normal parallel relation. It is desirable, therefore, to provide means for insuring that the movement of the movable member of the block be limited to a straight line.

In the embodiment of the invention illustrated in Figs. 8 to 11 inclusive, the elements of the adjustable block are confined at the sides between the walls 22, 22 of a U-shaped casing 23. The said elements of the block consist in this instance of a member 24 having opposite parallel faces, 25 and 26 respectively, and which in assembly is secured to the walls 22 of the casing 23 in the manner hereinafter described; a member 27 whose opposite faces 28 and 29 form an angle with each other and which member is confined between the walls 22, 22 against longitudinal movement, also as hereinafter described; and an intermediate member 31 whose opposite faces 32 and 33 also form an angle with each other in the longitudinal direction and which, while confined transversely between the walls 22, 22 of the casing 23, is still free to move in the longitudinal direction between said walls.

In the present instance the member 24 is secured to and between the walls 22, 22 by means of screws 34, the heads of which occupy countersunk recesses 35 in the walls 22 and which are threaded into transverse correspondingly threaded bores 37 in the member 24. As illustrated in Fig. 10 the conical walls of the countersunk recesses 35 seat snugly in complementary countersunk recesses 36 at the outer ends of the threaded bores 37. The member 24 extends somewhat beyond the lower edges of the walls 22 so that the surface 25 of the member 24 is clear of and unobstructed by the casing 23.

The casing 23 may be formed from an integral sheet metal blank 39 of the shape shown in Fig. 11, said blank being bent approximately along lines a—a and b—b to produce the parallel walls 22, 22. The blank is formed so that one of these walls 22 has at its outer or free end a projecting lug 41, and the other of the walls is formed with a corresponding lug 42 adjacent its opposite or inner end. Both of these lugs adjoin the upper surface of the casing and in the finished article are bent at right angles to the respective walls 22 and inwardly toward the opposite wall as well illustrated in Figs. 9 and 10, whereby they may function as stops or abutments for the ends of the block member 27, immobilizing this block against longitudinal movement between the walls 22, 22 while leaving the block free to move in a direction normal to the surface 25 of the member 24. The longitudinal tapers of the members 27 and 31 are such that when the members are assembled in the device as shown in Fig. 8, the surface 29 of the member 27 is parallel to the surface 25 of the member 24, and since the members are held in true alignment by and between the walls 22 of the casing 23, which walls preclude any relative movement between the members except in a straight line parallel to the inner surfaces of said walls or in a direction normal to the parallel surfaces 25 and 26 of the relatively fixed member 24, the surfaces 25 and 29 of the members 24 and 27 respectively are necessarily maintained in their original parallel relationship. It is to be noted that the dimensions of the walls 22 and of the members 24, 27 and 31 are such that the upper portion of the member 27 will project beyond the proximate edges of the walls 22, so that the surface 29 of the member 27, which constitutes one of the gaging surfaces of the block as a whole, will be left unobstructed by the casing.

Suitably secured in the end wall 43 of the casing 23 is a bushing member 44 which is provided with a bore, the axis of which is aligned with the intermediate block member 31. This threaded bore receives the threaded stem 45 of an adjusting screw 46, the inner end of which will normally engage the proximate and thicker end of the intermediate block member 31. By turning the screw 46 inwardly in the bushing 44 the member 31 may be advanced longitudinally in the casing so as to displace the member 27 outwardly away from the relatively fixed block member 24 to thereby increase the distance between the gaging surfaces 25 and 29 of the block. In this instance movement of the movable member 31 in the opposite direction, or toward the right as viewed in Fig. 8, will be effected by manual or other pressure exerted on the outer or lesser end of the said member after the screw 46 has been backed away from the opposite end. In either event, however, the longitudinal movement of the member 31 will be accompanied by a related movement of the member 27, this by reason of the fact that the surfaces 28 of the latter member and the surface 33 of the member 31 are so accurately formed as flat planes that, having been "wrung" together in known manner, they will adhere to each other by molecular attraction. Similarly, the plane surfaces 32 and 26 of the members 31 and 24 are so accurately formed that they also adhere, so that in effect the members 24, 27 and 31 in normal assembly constitute an interconnected unit retained as such between the walls 22 of the casing by reason of the connection of the member 24 to said walls and the aforesaid molecular attraction between the contacting surfaces of the block members.

The mode of use and manipulation of the block described above is essentially the same as that of the adjustable block illustrated in the preceding figures of the drawings, except that in this instance, as previously stated, the adjustment of the block through the medium of the adjusting screw 46 is always from a small dimension to a larger. When it is desired to adjust the block to a smaller dimension, other means for displacing the member 31 longitudinally between the walls 22 must be employed, said displacement being great enough to permit subsequent readjustment of the block to the desired dimension by means of the screw 46.

It is to be noted that in both embodiments of the invention described above the contacting surfaces of the block members of the adjustable block are plane and continuous surfaces which may be formed by practical methods to the high degree of accuracy required in an adjustable gage element of this character, and that by reason of this fact a set of gaging blocks utilizing an adjustable block made in accordance with my invention will possess the same high degree of accuracy as the standard blocks previously employed. A set of blocks employing an adjustable block of this character in conjunction with a gaging instrument of the character herein described and in accordance with the procedure set forth, will maintain the original accuracy without change, even after extended periods of use.

I claim:

1. A unitary adjustable gage block of the class set forth, said block comprising a pair of outer members and an intermediate member superimposed so as to form together a solid block body having opposite parallel plane gaging surfaces, the surface of each of said members in contact with a proximate face of another of said members being plane and continuous from each side edge thereof to the opposite side edge, the said surfaces of the intermediate member converging whereby the latter, by adjustment in the direction of said convergence with respect to the outer members, may act as a wedge to vary the state of relative displacement of the outer members in a direction normal to said gaging surfaces, and means operative during said adjustment for preventing relative angular displacement of said members so as to maintain the parallelinity of said gaging surfaces irrespective of the said relative displacement of the outer members in the planes of said converging surfaces.

2. An adjustable gage block according to claim 1 wherein the surface of one of the outer members which contacts the proximate face of the intermediate member is parallel to the opposite or gaging surface of said outer member.

3. An adjustable gage block according to claim 1 including means for relatively immobilizing the said outer members except as to movements in the direction normal to the said gaging surfaces.

4. An adjustable gage block according to claim 1 wherein a set of pins intersect the said outer and inner members at an angle to the gaging surfaces, said pins relatively immobilizing the outer members except as to movements normal to the gaging surfaces and being fitted to slots in the intermediate member so as to permit that member to move in the direction of said convergence while precluding angular displacement relative to the outer members.

5. An adjustable gage block according to claim 4 wherein springs supported on said pins exert pressure to hold the members together.

6. In combination with the outer and intermediate members of a gage block of the form defined in claim 1, a holder having means for exerting pressure upon the intermediate member to urge that member in the direction of said convergence and abutment means for engagement with the respective outer members to restrain the latter against movement with the intermediate member.

7. In combination, a gage block comprising a pair of outer members and an intermediate member superimposed so as to form together a solid block body having opposite parallel gaging surfaces, the surfaces of the intermediate member which contact the respective proximate faces of the outer members converging whereby the intermediate member by adjustment in the direction of said convergence with respect to the outer members may act as a wedge to vary the state of relative displacement of the outer members in a direction normal to said gaging surfaces, and a holder for said members having means operative during said adjustment by engagement with the opposite sides of the block for relatively immobilizing the outer members except as to movements in said normal direction and for guiding the intermediate member in said adjustments in the direction of said convergence.

8. The combination according to claim 7 wherein the holder is supported solely by said members and constitutes a unitary part of the gage block structure.

9. The combination according to claim 7 wherein the holder is rigidly attached to and is supported solely by one of the outer members.

10. The combination according to claim 7 wherein the holder consists of a U-shaped casing closely embracing the sides of said members and rigidly attached at said sides to one of the outer members, said casing having portions abutting the ends of the other of said outer members.

11. The combination according to claim 10 wherein the casing carries a thumb screw aligned with the intermediate member for engagement with one end of the latter and constituting a means for adjusting the intermediate member with respect to the outer members.

12. The combination with claim 7 wherein the holder includes manually actuated means for adjusting the intermediate member.

13. A gage block according to claim 1 wherein the means for preventing relative angular displacement of the outer and intermediate members are located laterally and outside the bounds of the said contacting surfaces of the members.

HILDING VALDEMAR TÖRNEBOHM.

References Cited in the file of this patent

UNITED STATES PATENTS

| Number | Name | Date |
|---|---|---|
| 1,272,997 | Powell | July 16, 1918 |
| 1,363,250 | Hanson | Dec. 28, 1920 |
| 1,472,837 | Hoke | Nov. 6, 1923 |
| 1,588,963 | Harter | June 15, 1926 |
| 1,650,563 | Reiman | Nov. 29, 1927 |
| 2,108,414 | Schurr | Feb. 15, 1938 |
| 2,287,890 | Legassey | June 30, 1942 |
| 2,308,946 | Wagner | Jan. 19, 1943 |
| 2,309,142 | Stafford | Jan. 26, 1943 |

FOREIGN PATENTS

| Number | Country | Date |
|---|---|---|
| 554,054 | England | June 17, 1943 |

OTHER REFERENCES

Publ.: Fig. 2, June 21, 1924, Herlth Adjustable Parallel Gauges, The O. B. Herlth Co. Inc., 272 Tolland Street, East Hartford, Conn.

Publ.: Standard Gauge Catalog No. 6A, p. 6, March 7, 1934.

Publ.: Johansson Catalog No. 17, p. 20, August 9, 1945.